Figure 1:
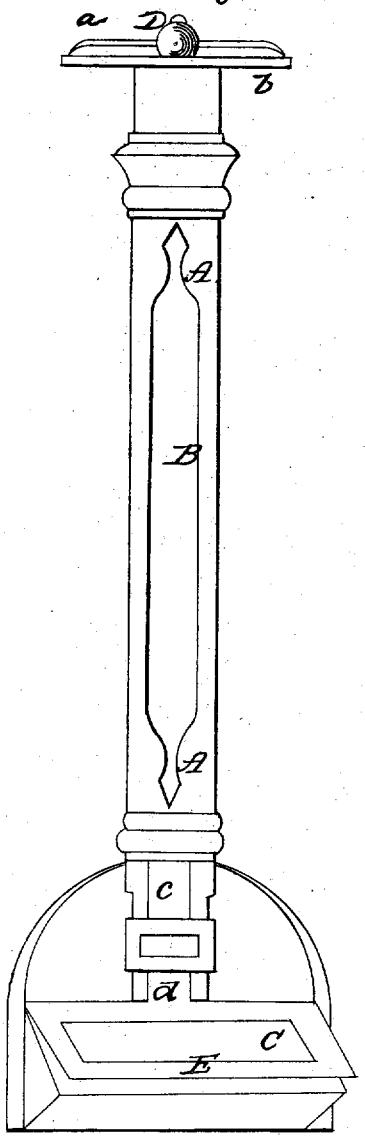
Figure 2:
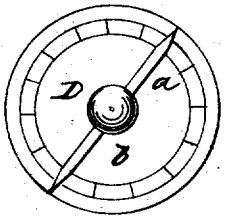
Figure 4:
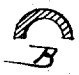
Figure 3:
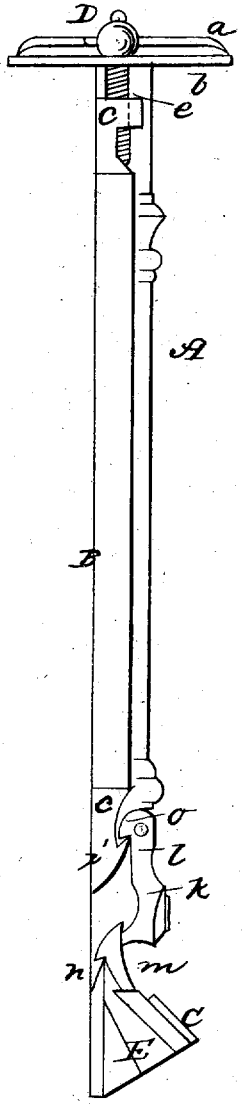

W. RACE.

Damper.

No. 1,139. Reissued Feb. 19, 1861.

N. PETERS, Photo-Lithographer, Washington, D. C.

UNITED STATES PATENT OFFICE.

S. H. RANSOM & CO., OF ALBANY, NEW YORK, ASSIGNEE OF WASHBURN RACE.

IMPROVEMENT IN REGISTERS FOR STOVES.

Specification forming part of Letters Patent No. 4,443, dated April 4, 1846; extended seven years; Reissue No. 1,139, dated February 19, 1861.

*To all whom it may concern:*

Be it known that WASHBURN RACE, of Seneca Falls, in the county of Seneca and State of New York, did invent a new and improved apparatus for rendering the registers of stoves and other inclosed fire-places self-acting by the unequal contraction and expansion of different metals by equal changes of temperature; and we do hereby declare that the following is a full and exact description thereof.

The apparatus of the said self-acting register is intended generally to be attached to the outside of the stove, but in contact therewith, or so near thereto as to be readily affected by the heat thereof, and is constructed as follows: There is a plate of iron, (wrought or cast, but cast-iron is preferred,) which is called the "sustaining-plate." This plate is from one to two feet in length, but for convenience' sake, as well as for appearance, this plate is made in length equal to the height of the stove, and at or near the lower end it is enlarged in width, so as to contain and surround the air-holes by a border or curb, upon which the register rests when closed, as hereinafter described. This sustaining-plate may be of any width, thickness, and shape which fancy or convenience may dictate, but the width of about one and a half inch and thickness of one-fourth of an inch is sufficient. In the back side of the sustaining-plate, or the side next to the stove, is a longitudinal groove, (the section of which may be rectangular, semicircular, or any other convenient shape,) extending from within about a quarter of an inch from the top of the sustaining-plate to the upper end of the vertical lever, hereinafter mentioned. This groove is from one-quarter of an inch to one inch in width, and from one-quarter to one-half an inch in depth, more or less. In this groove a slip or rod of brass, called the "expansion-rod," is suspended by a screw, which is termed the "regulating-screw", passing through the upper end of the sustaining-plate into the groove above mentioned and tapped into the upper end of the brass slip or rod, which is here enlarged in thickness for that purpose, but it is preferred to make this enlargement by riveting thereto a short piece of iron or other metal of sufficient size to receive the screw, the head of the screw or collar thereon resting upon the top of the sustaining-plate. To the lower end of the expansion-rod is firmly fastened, by riveting or otherwise, a piece of iron or other hard metal, near the lower end of which a sharp hook or barb is made pointing upward, which hook or barb enters and rests against a nick cut in the upper end of a vertical lever of about two inches in length, the bottom of the nick in the vertical lever being about one-eighth of an inch from its fulcrum and in a line horizontal with the fulcrum. This fulcrum may be a small pin about one-twelfth of an inch in diameter, passing through the vertical lever and through two projecting pieces or ears made for that purpose on the sustaining plate. It will be seen that this lever is in effect a bent or right-angle lever, the longer arm being vertical and the shorter arm horizontal, the fulcrum being in the angle. This lever vibrates backward and forward in a slot or mortise made through the sustaining-plate. The register is a piece of metal made plane and smooth upon its lower surface, and when closed lies at an angle from a vertical line sufficiently inclined to cause it to close by its own weight. From the upper part of the register a tail-piece or short lever projects upward, and behind the lower end of the vertical lever, in the back side of the tail-piece, a nick is cut, which fits upon an edge formed at the lower end of the slot or mortise in the sustaining-plate above mentioned, so that the register is sustained by this edge, and turns upon it as a fulcrum or center. A small projection upon the inner side of the vertical lever at or near its lower end acts against the tail-piece about one-eighth of an inch above the edge aforesaid, so that when the expansion-rod is contracted by cooling the vertical lever is operated and caused to press upon the tail-piece of the register and open it, and when the expansion-rod becomes dilated by heat the vertical lever is liberated, and permits the register to close more or less by its own weight, according to the degree of heat to which the expansion-rod is subjected; and if from any cause the heat of the stove should not be checked at the required temperature and the rod should continue to expand, no part of the apparatus will be strained, as the expansion-rod frees itself from the lever by the very act of expansion, which would not be the case if the parts were linked together by joints. To the screw in the upper end of the sustaining-plate is attached an index, under which, and attached to the stove or the sustaining-plate, is a circular index-plate, marked as may be convenient, so that by turning the screw the register may be caused to open and close at any desired temperature.

In order to render the register more sensitive, openings are made quite through the sustaining-plate along the whole or nearly the whole length of the expansion-rod, thus exposing it to air in the room, thereby regulating the fire by the influence of the heat of the stove and the air of the room. The sustaining-plate, with the expansion rod, vertical lever, and register connected with it, as above described, is fastened by screws or otherwise in a vertical position to the stove, so that the draft-hole in the sustaining-plate shall coincide with a similar one in the stove, and it is then ready for use.

One part of the said invention may be dispensed with and the expansion-rod and appendages applied to the plates forming the stove or a part thereof, and in such case I prefer placing the expansion-rod upon the outside of the stove; but it may, however, be placed inside the stove with or without a separate sustaining-plate if it be desired to regulate the fire by the temperature of the heat inside of the stove only.

In order more clearly to describe the said invention, we have hereunto annexed drawings thereof, as follows, viz:

Figure I is a front view of the said apparatus separate from a stove. A A is the sustaining-plate; B, the expansion-rod, seen through a longitudinal opening in the sustaining-plate; C, the register, partly open, showing E, the draft-hole, through which the air passes into the stove; D, the head of the regulating-screw; *a a*, the index attached to the said screw; *b b*, the index-plate in section; *c*, the vertical lever, and *d* the tail-piece of the register.

Fig. II is a plan of the index-hand and circular index-plate.

Fig. III is a vertical section of the whole apparatus above described, in which A A is the sustaining-plate; B, the expansion-rod, which is semi-circular in its cross-section, as shown in Fig. IV; C, the register, partly open; D, the regulating-screw; *a a*, the index attached to the same; *b b*, the index-plate; *c c*, short pieces of iron riveted to the ends of the expansion-rod, into the upper one of which the regulating-screw is tapped, as at *e*. The lower piece of iron is formed into a hook or barb, as shown at *i*, which engages a corresponding hook or barb, *o*, on the vertical lever *k*, which has its fulcrum at *l*. *m* is the tail-piece of the register, projecting upward and behind the lower end of the vertical lever, the said tail-piece being formed with a hook or barb, which sustains the register upon an edge at *n*, and constituting its fulcrum.

The advantages of the said invention are, first, the whole regulating apparatus is mounted on and attached to a separate plate, so that it can be made separately and afterward attached to any stove, and when the stove is worn out it can be detached and applied to another stove; second, the inflexible expansion-rod is exposed at the same time to the influence of the heat radiated from the stove and to the atmosphere of the room, so that the temperature of the room to be heated, as well as the heat radiated into the room, jointly influence the regulation of the fire—a result never obtained before the said invention by means of an inflexible expansion-rod, and at the same time the expansion-rod is effectually protected against injury from blows and other causes; third, by forming the connection between the expansion-rod and the register in the manner described the apparatus is secured against strain and breakage, such as would unavoidably occur with rigid connections in case of accidental overheating of the stove, for it will be seen that after the expansion-rod has expanded to an extent sufficient to permit the register to be closed by the force of gravity it may go on expanding to any degree without any restraint of any kind and without acting on any part of the apparatus, and so, if anything should check the closing of the register as the rod is expanded, it will be obvious that no part of the apparatus can be strained by the continued expansion of the rod.

Prior to the said invention of the said WASHBURN RACE regulators for stoves were made with the expansion apparatus placed within the joint influence of the heat radiated by the stove and the atmosphere of the room, but in such cases the expansion apparatus consisted of a compound bar, made of two different metals, having different degrees of expansion, and united so that the differential expansion of the two metals should cause the compound bar to bend and by such bending to operate the damper; but this was found in practice to be defective, for the reason that the compound bar soon lost its property of accurate deflection, and it was not protected; and for that reason very liable to be deranged by accidental blows.

What we claim as the invention of WASHBURN RACE in a stove regulator is—

Connecting the expansion-rod with the register in the manner substantially as herein described, and for the purpose specified.

S. H. RANSOM & CO.

Witnesses:
WM. H. BISHOP,
ANDREW DE LACY.